(12) United States Patent
Hernanz Arbeloa et al.

(10) Patent No.: US 9,102,408 B2
(45) Date of Patent: Aug. 11, 2015

(54) TROLLEY FOR AIRCRAFT

(75) Inventors: Ángel María Hernanz Arbeloa, Boadilla del Monte (ES); Jose Antonio Freire De La Cruz, Boadilla del Monte (ES)

(73) Assignees: Industrial Neo Tex, S.A. (ES); Ángel Maria Hernanz Arbeloa (ES); Jose Antonio Freire De La Cruz (ES)

( * ) Notice: Subject to any disclaimer, the term of this patent is extended or adjusted under 35 U.S.C. 154(b) by 337 days.

(21) Appl. No.: 13/696,958

(22) PCT Filed: May 12, 2011

(86) PCT No.: PCT/EP2011/057683
§ 371 (c)(1),
(2), (4) Date: Jun. 28, 2013

(87) PCT Pub. No.: WO2011/141539
PCT Pub. Date: Nov. 17, 2011

(65) Prior Publication Data
US 2015/0040606 A1     Feb. 12, 2015

(30) Foreign Application Priority Data

May 13, 2010   (EP) .................................... 10382120

(51) Int. Cl.
*F25D 3/00*       (2006.01)
*B64D 11/00*    (2006.01)
*B62B 3/00*      (2006.01)

(52) U.S. Cl.
CPC ............ *B64D 11/0007* (2013.01); *B62B 3/003* (2013.01); *B62B 3/005* (2013.01); *B62B 3/006* (2013.01); *F25D 3/00* (2013.01);
(Continued)

(58) Field of Classification Search
CPC ........ B62B 3/006; B62B 3/003; B62B 3/005; B62B 2202/67; B62B 2204/04; F25D 3/00; B64D 11/0007; B64D 11/00
USPC ..................... 62/457.1, 457.2, 530, 237, 430; 312/306, 308, 236
See application file for complete search history.

(56) References Cited

U.S. PATENT DOCUMENTS

| | | | |
|---|---|---|---|
| 4,026,351 A | * | 5/1977 | Biava .............................. 165/58 |
| 4,418,930 A | * | 12/1983 | Ryan, Jr. .................... 280/47.19 |
| D408,953 S | * | 4/1999 | Golichowski et al. ......... D34/21 |

(Continued)

FOREIGN PATENT DOCUMENTS

| | | |
|---|---|---|
| DE | 202007005036 U1 | 7/2007 |
| DE | 102006044847 A1 | 3/2008 |

(Continued)

OTHER PUBLICATIONS

International Search Report, Aug. 18, 2011.

*Primary Examiner* — Mohammad M Ali
(74) *Attorney, Agent, or Firm* — Tristan A. Fuierer; Moore & Van Allen, PLLC (57) ABSTRACT

The present invention is aimed at a storage trolley body for aircraft which incorporates refrigeration means storing the cold source and allowing the distribution thereof in a uniform manner to all the parts inside the trolley. The proposed solution provides additional advantages such as the increase of the structural rigidity of the trolley body incorporating these refrigeration means.

14 Claims, 5 Drawing Sheets

(52) U.S. Cl.
CPC ........ *B62B 2202/67* (2013.01); *B62B 2204/04* (2013.01); *B62B 2204/06* (2013.01); *B62B 2501/065* (2013.01)

(56) References Cited

U.S. PATENT DOCUMENTS

| | | | |
|---|---|---|---|
| 5,895,104 A * | 4/1999 | Grandi | 312/403 |
| 5,964,101 A * | 10/1999 | Schulak et al. | 62/430 |
| 5,975,202 A * | 11/1999 | Grandi | 165/48.1 |
| 6,055,996 A * | 5/2000 | Sprenger et al. | 134/133 |
| 6,068,356 A * | 5/2000 | Giuseppe | 312/290 |
| 6,106,084 A * | 8/2000 | Thogersen et al. | 312/306 |
| 6,295,829 B1 * | 10/2001 | Gibot | 62/371 |
| 6,359,268 B1 * | 3/2002 | Walter | 219/622 |
| 6,427,761 B1 * | 8/2002 | Georges | 165/48.1 |
| 6,941,764 B2 * | 9/2005 | Leroy et al. | 62/237 |
| RE39,551 E * | 4/2007 | Speranza | 221/1 |
| 8,186,178 B2 | 5/2012 | Böss | |
| 2002/0096509 A1 * | 7/2002 | Von Mosshaim | 219/452.11 |
| 2004/0134393 A1 * | 7/2004 | Home | 108/153.1 |
| 2004/0194487 A1 * | 10/2004 | Leroy et al. | 62/237 |
| 2008/0190941 A1 * | 8/2008 | Olson et al. | 220/592.26 |
| 2009/0145154 A1 * | 6/2009 | Konrad et al. | 62/298 |

FOREIGN PATENT DOCUMENTS

| | | |
|---|---|---|
| DE | 102008009249 A1 | 8/2009 |
| GB | 2054115 A | 2/1981 |

* cited by examiner

Prior Art

TROLLEY FOR AIRCRAFT

CROSS-REFERENCE TO RELATED APPLICATIONS

This application is filed under the provisions of 35 U.S.C. §371 and claims the priority of International Patent Application No. PCT/EP2011/057683 filed on 12 May 2011 entitled "Trolley for Aircraft" in the name of Angel Maria HERNANZ ARBELOA, et al., which claims priority to European Patent Application No. EP 10382120.3, filed on 13 May 2010, both of which are hereby incorporated by reference herein in their entirety.

OBJECT OF THE INVENTION

The present invention is aimed at a storage trolley body for storing food and beverage container trays and/or drawers for aircraft, which incorporates refrigeration means consisting of a container tray for a cold source with a configuration and arrangement such that they allow the distribution thereof in a uniform manner from the latter to all the parts inside the trolley. Cold trays current have large cold losses and do not allow a uniform distribution.

The proposed solution provides additional advantages such as the increase of the structural rigidity of the trolley, a more long-lasting maintenance of the cold, in addition to reducing the number of parts forming the trolleys which incorporate these cold source refrigeration, distribution and storage means. The cold storage and distribution tray becomes a part of the trolley body instead of having to be removed to perform each reload of the cold source, as occurs with current cold source storage trays.

BACKGROUND OF THE INVENTION

Currently, the trolleys used in aircraft to, for example, distribute food to passengers, comprise a main body with a prismatic shape in which the smaller vertical sides allow the access to the interior. The side walls of the trolley, forming the larger sides, have supports for trays and/or drawers in which the food and/or beverage which is individually distributed to each user during the flight is stored. These trays and/or drawers will hereinafter be referred to as storage elements.

Currently, when these storage elements have to be refrigerated for the correct preservation of foods or other items contained therein, the upper part of the trolley (the head) has one or more container trays which are capable of storing carbonic ice, for example. These cold source container trays can have: one or more windows made at their base to facilitate the cold outlet; or no window (which, although it seems absurd, is real). This cold must move downwards, for example, facilitated by the higher density of the gas at lower temperature, through one or two narrow and elongated outlets, made close to the point of passage of the smaller axis of the support panel of these trays. This form of cold transmission, already from the start means that a large part of the cold supplied by the source towards the exterior of the trolley will be lost. One of the cases is that the gap in which these container trays are housed is not hermetic and the actual support base of the container trays hinders the entrance of the refrigerating gas inside the trolley. The entrance is hindered due to having only one or two holes made therein, making another large part of the gas fall on the support panel, which is made in an insulating material (rigid foam), whereby another part of the refrigerating power of the source is lost. Furthermore, but not less important, this gas currently does not reach all the food and beverage storage elements. The cold source container trays are arranged parallel to the lower base of the trolley.

In practice, the cold emanated from the cold source container tray reaches the upper storage trays and/or drawers, the closest ones, located about six centimeters below, such that it is usual for part of their contents to be frozen, making them unsuitable for on-board service. The cold gradually reaches the farthest trays (in a downward direction), weakly reaching the lower ones which are not suitably refrigerated.

This is added to the fact that the inner and outer part of current on-board service trolleys are made of metal, whereby there is another large cold loss since these large panels distribute heat into the trolley, because due to current construction, the heat from the exterior is transmitted by thermal conductivity through the aluminium profiles towards the aluminium panels forming the interior of the trolley.

Due to the above, the system of refrigeration known in the state of the art and cold maintenance for the foods and beverages contained in the trolleys is not very efficient, causing financial losses for the airlines since the foods contained in these trolleys must occasionally be discarded to prevent possible passenger intoxications, since microorganisms can proliferate.

The present invention solves the problem of lack of homogeneity in the refrigeration of the food and beverage storage elements located inside the trolley by establishing means which give rise to a different cold distribution, resulting in a homogeneous cold supply in addition to being able to store therein a larger amount of cold sources and having much lower losses of such cold, especially if the system is combined with a trolley for aircraft with a body constructed in expanded foamed material, all of which leads to a better distribution, increase of the cold source storage capacity and longer refrigeration maintenance time.

Additionally, the proposed technical solution increases the structural rigidity of the trolley and reduces the number of mobile (removable) parts thereof, which would lead to the elimination of breakdowns of the current type of container tray, in which the spring closures manufactured in plastic incorporated therein break, being able to cause the cold source to fall to the floor and injuries to people, or they do not enter their housing and/or closures are not engaged in the housings arranged for that purpose in the trolley when the trolley experiences an impact and is slightly deformed.

DESCRIPTION OF THE INVENTION

The present invention consists of a refrigerated storage trolley with a cold tray for aircraft given that they are elements intended to be coupled to one another to give rise to a storage means for suitably storing refrigerated storage trays.

Therefore, a first object of the invention is a storage trolley with a cold tray for aircraft comprising at least:
 a lower base,
 an upper base,
 two side walls extending between the upper base and the lower base containing supports for a plurality of storage elements in which such supports are distributed along the direction perpendicular to the lower base,
 a cold source,
all of this according to the preamble of claim one.

The most usual particular modes of configuration have the storage trays and/or drawers distributed vertically between the two walls and guided by the supports present in the walls. Although the side walls allow securing the storage elements, also according to the most usual particular modes of configuration, the other vertical faces allow the access to the food and beverage storage elements. These smaller vertical faces, the narrowest ones, can be closed by means of doors. The simplest configuration has a door in a vertical face with a closed bottom in the other one (referred to as half size trolley); and the larger configuration having doors on both sides (referred to as full size trolley), to allow introducing removing trays from both sides.

The invention according to this first aspect of the invention is characterized in that it has securing means for receiving the tray with cold source storage capacity such that such securing means determine a position of the tray such that it essentially extends in a direction perpendicular to the lower base to allow cold outlets distributed along the length thereof; i.e., according to the characterizing part of claim one.

The presence of a cold tray capable of storing the cold source, which essentially extends in a direction perpendicular to the lower base means that the distance between each storage element and the cold tray is approximately the same.

Any of the embodiments of a trolley resulting from combining dependent claims 2 to 16 is considered to be incorporated in this description by reference.

Both elements of the storage trolley with the cold tray, the trolley body and the cold tray, are intended to be coupled to one another in order to operate such that the storage elements which are in the trolley are homogeneously refrigerated, and the temperature losses are minimized. This is particularly reflected according to claim 16 in which the cold outlets offered by the cold tray are made to coincide with the distribution of the storage trays. The cold exiting between the storage trays allows an optimal way to interrelate both components, the trolley body and the cold tray.

DESCRIPTION OF THE DRAWINGS

These and other features and advantages will be more clearly shown from the following detailed description of a preferred embodiment, given only by way of an illustrative and non-limiting example, with reference to the attached figures.

DETAILED DESCRIPTION OF THE INVENTION

The present invention consists of a trolley (1) of food and beverage storage elements for aircraft which allows the refrigeration thereof in an efficient manner.

Figure 1:
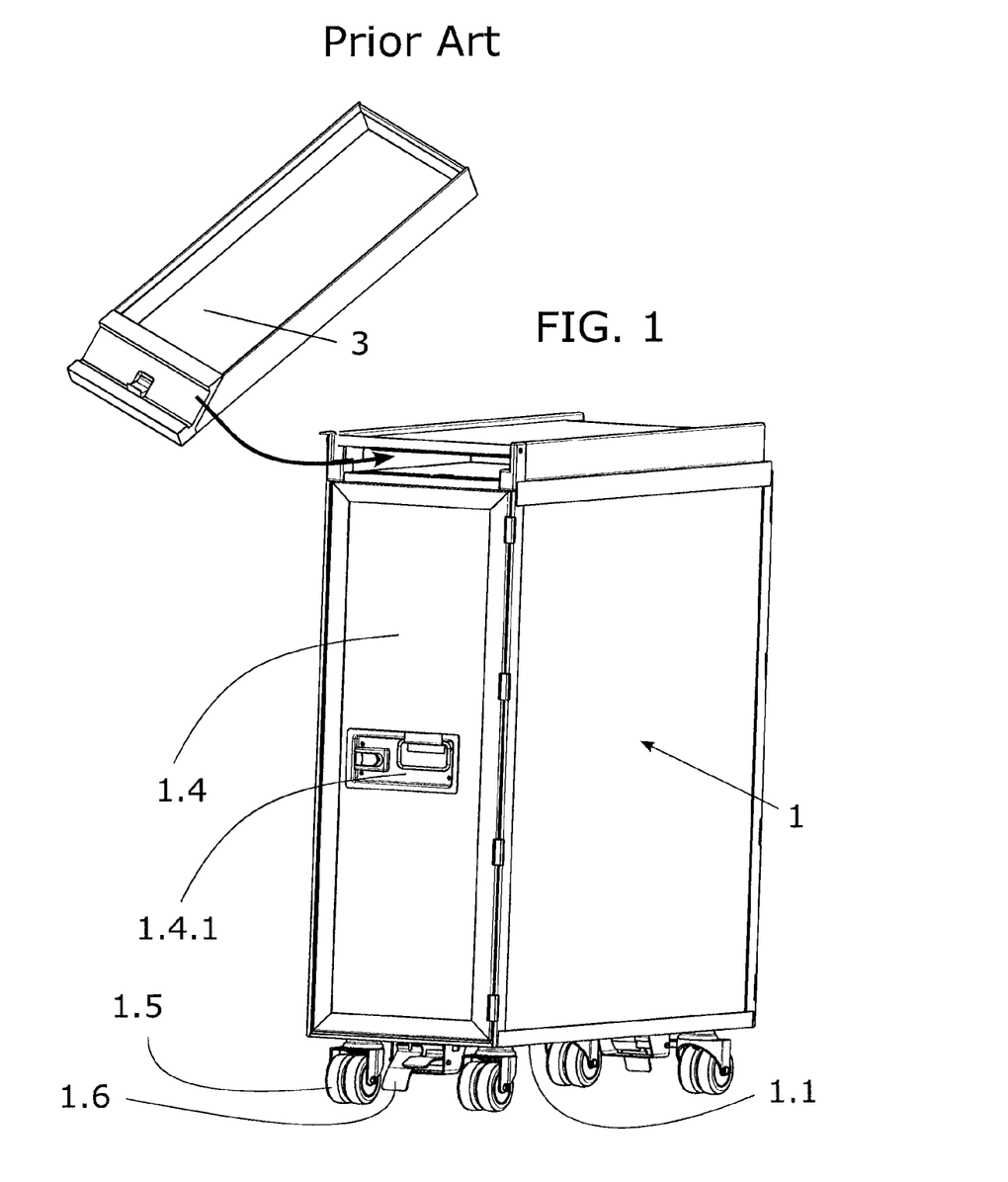
FIG. 1. This figure shows a trolley such as those used in the state of the art, in which the carbonic ice storage tray is located in the head, upper part, of the trolley.

FIG. 1 shows a trolley (1) of the state of the art which has a prismatic main body formed by a lower base in which the wheels (1.5) and the locking brakes (1.6) of the trolley (1) to prevent it from moving with the rocking of the aircraft are located.

On the lower base there are raised two larger side walls which are closed by two doors (1.4), a front door (the visible one) and another rear door (which is concealed according to the perspective selected).

The use of two doors (1.4) of access to the interior allows, for example, two flight attendants to serve the passengers at the same time since each of them has access to the interior of the trolley (1) from a different smaller side.

It is also possible to have a front door (1.4) on a smaller side and for the other smaller side to be closed (referred to as half size trolley).

The interior of the trolley (1) contains a plurality of storage trays and/or drawers (for example with all the foods and beverages for a meal) distributed vertically, i.e., distributed according to the direction perpendicular to the lower base (1.1). In this figure the storage trays cannot be seen since the trolley (1) is closed. Continuing with the description of a trolley (1) according to the state of the art, the cold source is located in the upper part in a cold source storage tray (3).

Figure 2:
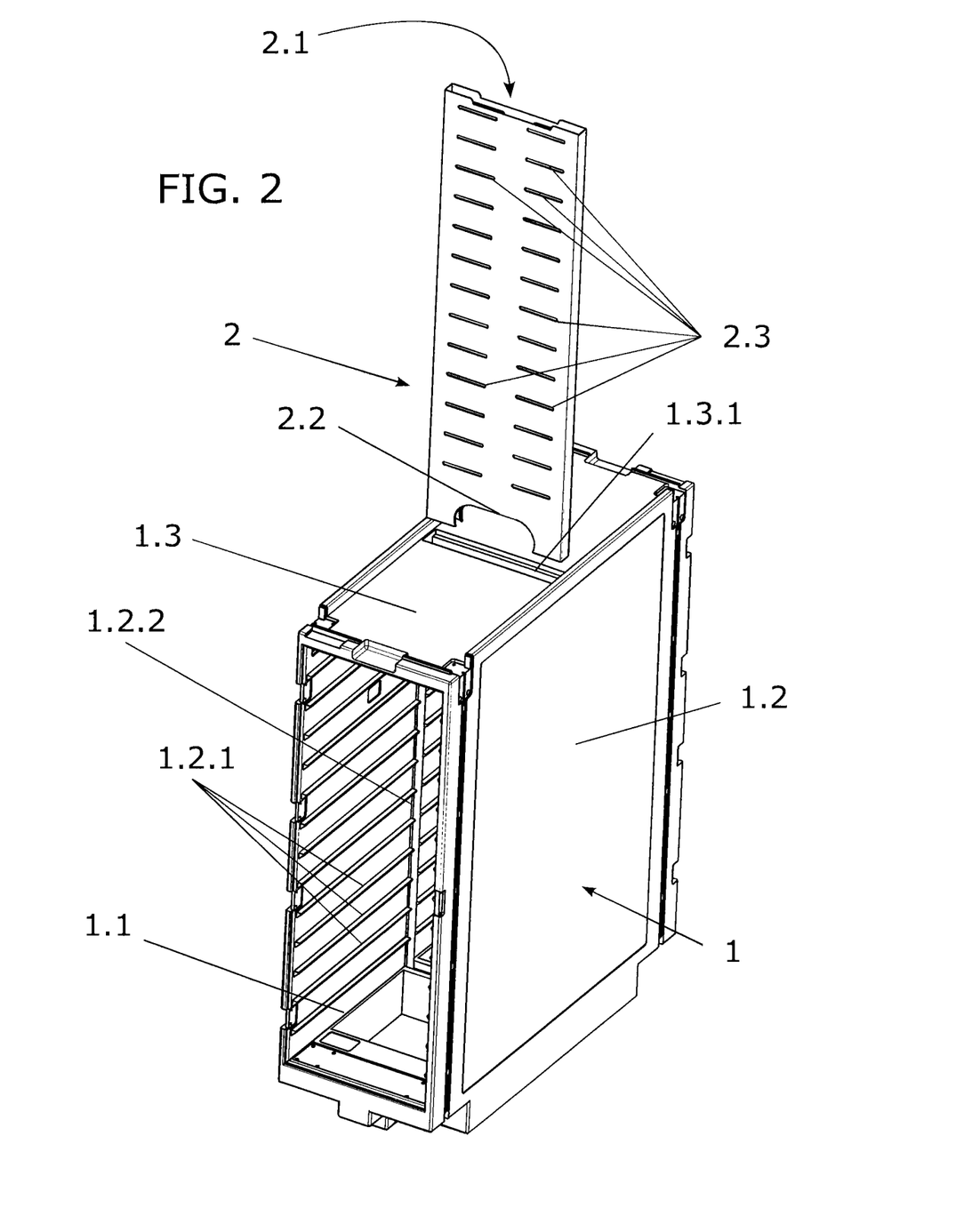
FIG. 2. This figure shows an embodiment of the invention with relevant elements for its description. Wheel or doors are not shown in order to simplify the graphic depiction of the trolley, only what is referred to as the trolley body is shown.
Figure 3:
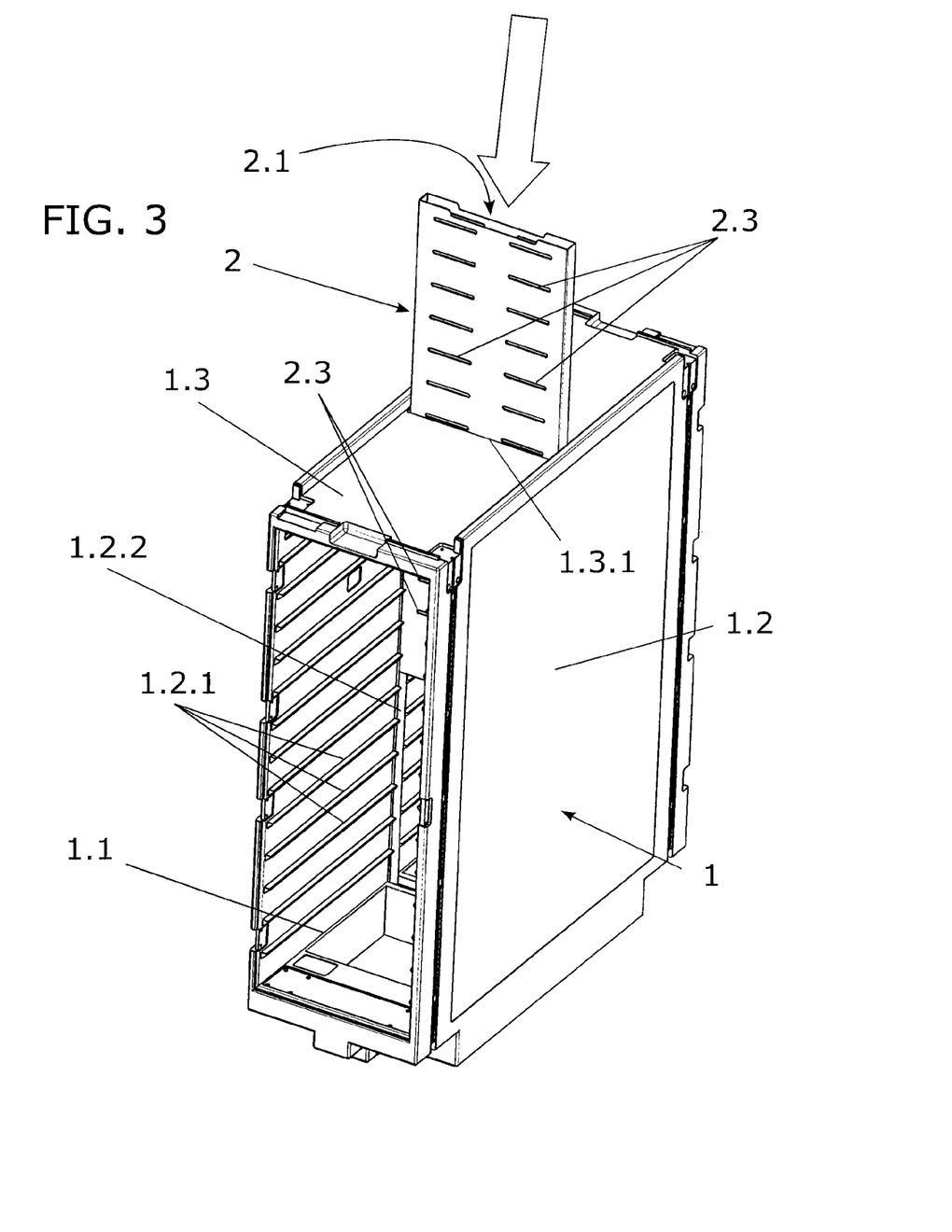
FIG. 3. This figure shows the same embodiment of the invention in which the cold tray has been partially introduced in the trolley.

This cold tray (3) is distinguished with number 3 in order to differentiate it from the cold tray (2), which is shown in FIGS. 2 and 3, according to the invention, which is identified with number 2.

FIG. 1 shows a perspective view of the cold tray (3) intended to house the carbonic ice; and the place in which the cold source storage tray (3) is inserted in order for the cold source to be located in the head or upper part of the trolley (1) is indicated by means of a thick curve ending in an arrow tip.

The cold source will deliver the cold in the upper part of the main trolley (1) body, only part of the gas reaching the interior of the trolley to be refrigerated. This part of gas reaches the upper storage trays and/or drawers to a greater extent and the lower storage trays to a lesser extent. As a result, a non-homogeneous cold distribution and a low refrigeration power, which does not last for a long time, are obtained. In practice, the content of the upper storage trays and/or drawers are frozen and the lower ones are not refrigerated.

FIGS. 2 and 3 show the solution to this problem according to a preferred embodiment of the invention. These figures only show the main trolley (1) body (not depicting, for example, the wheels or the locking system of said wheels to focus attention on the invention).

The main trolley (1) body according to this embodiment is formed by a lower base (1.1) on which there are raised two side walls (1.2) between which there is the inner space provided to be occupied by the food and beverage storage elements. The side walls (1.2) are connected at the upper part by means of the upper base (1.3) which in this example is parallel to the lower base (1.1).

The side walls (1.2) have supports (1.2.1) distributed vertically; i.e., according to the direction perpendicular to the lower base (1.1), and which maintain the storage trays. Both in FIG. 2 and in FIG. 3 the storage trays are not shown in order to see the interior of the trolley (1) more clearly.

The trolley (1), depicted in FIGS. 2 and 3, shown in this embodiment, makes use of two groups of supports (1.2.1), each of them arranged close to each of the doors (1.4) closing the smaller sides. These doors (1.4) are not shown either in order to allow observing the inner space of the trolley (1).

Between both groups of supports (1.2.1), there are securing means (1.2.2) for securing a cold tray (2). In this embodiment, the tray forms a central column and allows storing the cold source and distributing it when it is in an operative mode in the trolley (1). In this example, the securing means (1.2.2) are guides allowing the upper insertion of the cold tray (2) through a slot (1.3.1) in the upper base (1.3). The sliding is carried out through the side edges of the tray (2) which are configured such that they adapt to the configuration of the guide (1.2.2). The securing can be reinforced using screws, rivets, welding, etc., at any point of the guide (1.2.2).

Figure 4:
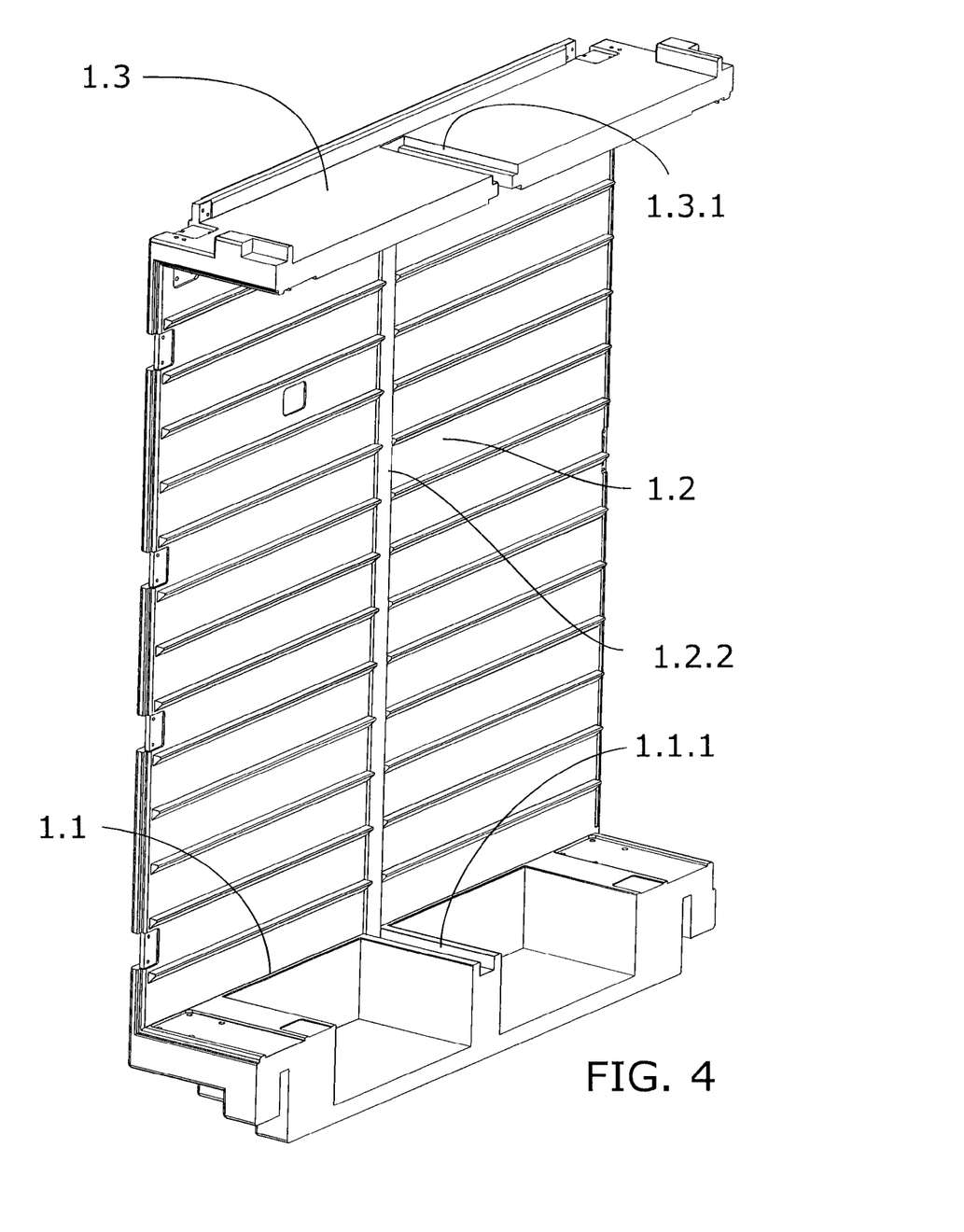
FIG. 4. This figure shows a section of the main body of the same embodiment of the invention according to a vertical plane in order to be able to see the interior of the trolley body.

FIG. 4 shows a section of the main trolley (1) body such that it is possible to observe the securing means (1.2.2) for securing the tray (2) according to this embodiment. The securing means (1.2.2) for securing the tray (2) start at the upper part from the slot (1.3.1) and reach the lower base (1.1) in which a transverse vertical wall with an upper groove (1.1.1) for receiving the support of the lower part of the cold tray (2) is located.

In this embodiment, the cold tray (2) has a main direction of greater length and which essentially coincides with the height of the inner space of the trolley (1). The cold tray (2) is a hollow body housing therein the cold source, preferably carbonic ice or dry ice.

The presence of outlets (2.3) distributed along the length thereof allow the cold to be supplied to each of the storage trays regardless of the height at which it is located.

The distribution of the outlets (2.3) in this embodiment is such that they are equidistributed in a symmetrical manner. Nevertheless, this distribution can be modified in number and geometry and dimensions. It can also be grouped by sectors according to a distribution of the type of elements to be stored.

In particular, the case in which the outlets (2.3) are made to coincide with the space between the consecutively arranged food and beverage storage elements is interesting, since the cold diffuses better through the space left by these trays.

To facilitate the insertion and removal of the cold source, in this embodiment the tray (2) has an upper window (2.1) and another lower window (2.2); the latter having a notch which allows better reaching the package of the cold source. Although not depicted in the figures, each of the windows (2.1) can be provided with a cover preventing the cold source from being directly involuntarily accessible and preventing cold losses.

To minimize these cold losses and increase the refrigeration time, the combination of the use of a cold tray (2) with a material for constructing the trolley (1) body such as expanded polypropylene (EPP) is suitable.

The presence of outlets (2.3) on both sides of the cold tray (2) allows reaching both groups of storage elements, those located in the supports (1.2.1) existing behind each door (1.4) of access and those located in opposition with respect to the main trolley (1) body.

The insertion and/or removal of the cold tray (2) is facilitated in this embodiment by the presence of the guides forming the securing means (1.2.2) thereof. The securing can be reinforced using adhesives, screws, rivets, welding etc., at any point thereof. The larger side edges of the cold tray (2) slide through such guides to remove or incorporate said cold tray (2).

Given that the final position adopted by the cold tray (2) essentially perpendicular to the lower base (1.1) is especially relevant for the invention, this final position can be reached in different ways without the invention being affected. It is thus also possible, for example, that the slot (1.3.1) for the insertion of the cold tray (2) is in the side wall (1.2) and the insertion is from a side. In this case, the guides which give rise to the securing means (1.2.2) for securing the cold tray (2) will be horizontal, parallel, located in the lower base (1.1) and upper base (1.3); and they will only extend along the length of the smaller side of the main trolley (1) body. A combination of both could also be possible, for example, by introducing the tray through the slot (1.3.1) and loading the cold source through an opening made in the wall (1.2) or vice versa.

The presence of the cold tray (2) in the inner space linking, in this case, the side walls (1.2) and the lower base (1.1) increases the rigidity of the main trolley (1) body usually subjected to the rocking due to the movement of the aircraft or to impacts. It is also considered relevant to construct the main body in a single piece of a material with a low heat transfer coefficient, such as expanded polypropylene (EPP) to increase to a greater extent the rigidity combined with the presence of a cold tray (2) according to the invention.

Figure 5:
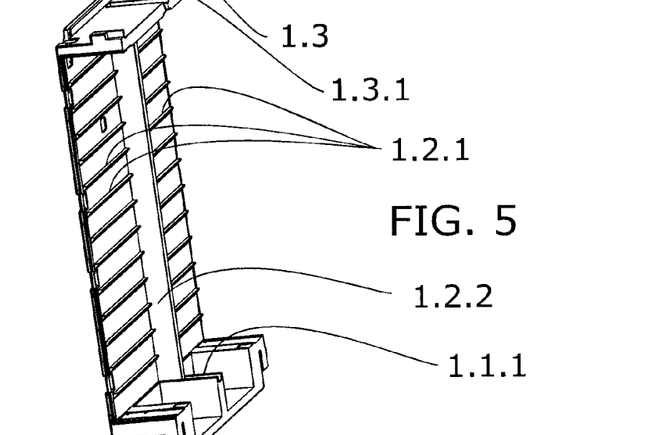
FIG. 5. This figure shows a section of the main body of another embodiment of the invention according to a vertical plane in order to be able to see the interior of the trolley body, in particular a central rib serving as securing means for securing the cold tray.
Figure 6:
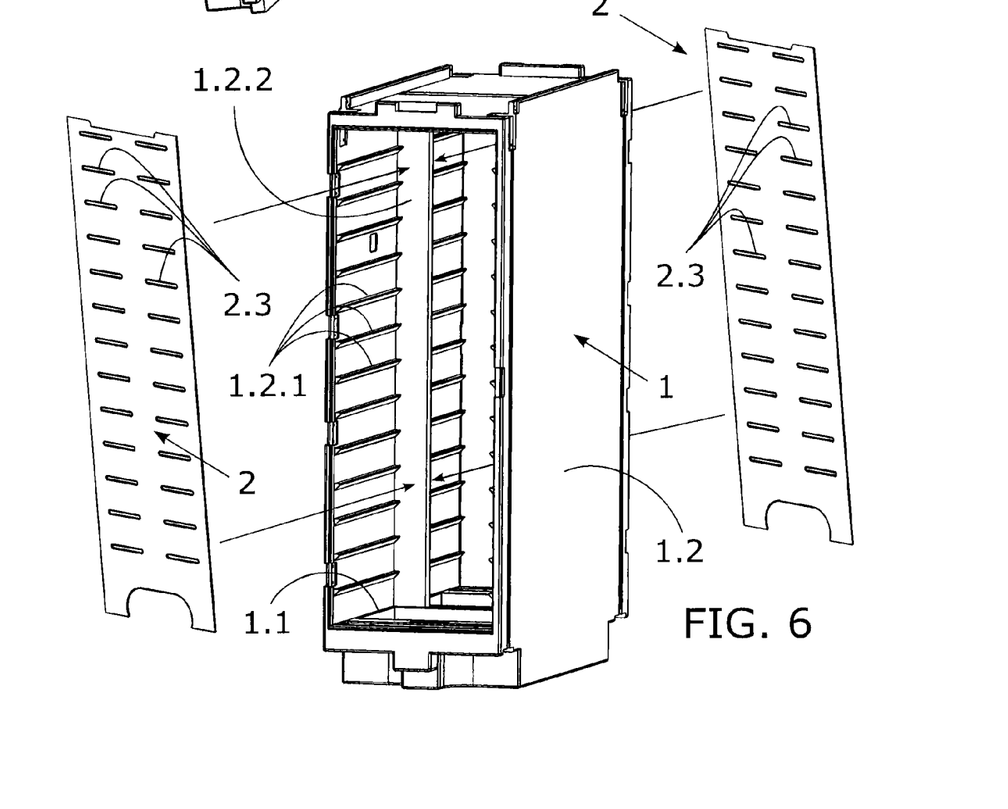
FIG. 6. This figure shows an exploded perspective view of a trolley body according to the embodiment of the previous figure, which shows two plates giving rise to the cold tray and how they are secured on the central rib.

FIGS. 5 and 6 show another particular way to carry out the invention which makes use of a trolley body in which the securing means (1.2.2) for receiving the cold tray (2) are sufficiently thick vertical ribs, such that they allow screwing.

FIG. 5, a section of the trolley body, allows observing the securing means (1.2.2) consisting of a rib with a width capable of receiving a plate, made of metal, for example, which will give rise to the cold tray (2), and which is subsequently screwed.

As shown in FIG. 6, the smaller vertical sides of the trolley body provide access to these thick ribs. The way to move the plates closer to the ribs forming the securing means (1.2.2) has been depicted by means of arrows. Once the plates, made of aluminum, for example, have been moved closer together, they are screwed, one to each side of the ribs. After screwing two plates arranged in parallel and leaving a space between them, a vertically arranged cold tray (2) is obtained. FIG. 6 shows the plates with holes giving rise to the cold outlets (2.3). With this configuration, the slot (1.3.1) serves to introduce the cold source inside the cold tray (2).

The invention claimed is:

1. A storage trolley with a cold tray for aircraft comprising at least: a
    lower base, an upper base, two side walls extending between the upper base and the lower base containing supports for a plurality of storage elements in which such supports are distributed along the direction perpendicular to the lower base, a cold tray as a cold source for being incorporated in the trolley body which is a hollow body, which extends mainly in one axial direction and a transversal direction, with a window of access to the cold source and a plurality of cold outlets distributed along a length thereof, characterized in that the two side walls have securing means for receiving the tray with cold source storage capacity such that the securing means determine a position of the tray such that the tray essentially extends in a direction perpendicular to the lower base to allow cold outlets distributed along the length thereof and the transversal direction extends in a direction essentially perpendicular to the two side walls.

2. The trolley according to claim 1, characterized in that the securing means (1.2.2) for receiving the cold tray (2) are guides allowing the introduction of the tray (2) by sliding and the cold tray (2) has means for sliding through the guides (1.2.2) according to a direction parallel to the main direction thereof.

3. The trolley according to claim 2, characterized in that the guides forming the securing means (1.2.2) for receiving a cold tray (2) allow the insertion of the tray (2) through the upper base (1.3) in a downward direction.

4. The trolley according to claim 2, characterized in that the guides forming the securing means (1.2.2) for receiving a cold tray (2) allow the insertion of the tray (2) through the side wall (1.2).

5. The trolley according to claim 1, characterized in that the securing means (1.2.2) for receiving the cold tray (2) are vertical ribs such that they allow screwing at least two plates with cold outlets (2.3) which, in their final operative arrangement, are separated and essentially parallel giving rise to the cold tray (2).

6. The trolley according to claim 1, characterized in that it has a second group of supports (1.2.1) for a plurality of storage elements distributed along the direction perpendicular to the lower base (1.1).

7. The trolley according to claim 6, characterized in that the securing means (1.2.2) for securing the cold tray (2) are such that they place said cold tray (2) between both groups of supports (1.2.1) for storage elements with cold outlets on both sides distributed along the length thereof for cooling both groups of storage elements.

8. The trolley according to claim 2, characterized in that it has a slot (1.3.1) for the insertion of the cold tray (2).

9. The trolley according to claim 1, characterized in that the cold source is dry or carbonic ice.

10. The trolley according to claim 1, characterized in that the main trolley body is formed as a one-piece body.

11. The trolley according to claim 1, characterized in that the cold tray (2) has a second window of access to the cold source.

12. The trolley according to claim 1, characterized in that the cold outlets of the cold tray (2) are equidistantly distributed along the length thereof.

13. The trolley according to claim 1, characterized in that the cold outlets of the cold tray (2) are distributed differentiating sectors along the length thereof.

14. The trolley according to claim 1, characterized in that the cold tray (2), incorporated in the trolley (1) body in operative mode, has its cold outlets (2.3) coinciding between two of the storage elements which are located in the supports (1.2.1) of storage trays.

\* \* \* \* \*

UNITED STATES PATENT AND TRADEMARK OFFICE
CERTIFICATE OF CORRECTION

PATENT NO. : 9,102,408 B2
APPLICATION NO. : 13/696958
DATED : August 11, 2015
INVENTOR(S) : Ángel María Hernanz Arbeloa and Jose Antonio Freire De La Cruz It is certified that error appears in the above-identified patent and that said Letters Patent is hereby corrected as shown below:

On the Title page, please change item (30) Foreign Application Priority Data to:

May 13, 2010 (EP) .............................. 10382120.3

Signed and Sealed this
Twenty-ninth Day of March, 2016

Michelle K. Lee
*Director of the United States Patent and Trademark Office*